(12) United States Patent
Inoue et al.

(10) Patent No.: US 6,307,829 B1
(45) Date of Patent: Oct. 23, 2001

(54) RECORDING OR PLAYBACK DEVICE FOR DISK CONTAINED IN CARTRIDGE

(75) Inventors: Tadashi Inoue, Neyagawa; Koichi Nakao, Higashiosaka; Toru Mori, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/401,305

(22) Filed: Sep. 23, 1999

(30) Foreign Application Priority Data

Sep. 25, 1998 (JP) .................................................. 10-271174

(51) Int. Cl.⁷ .................................................. G11B 17/10
(52) U.S. Cl. .............................................................. 369/219
(58) Field of Search ...................... 369/215, 219, 369/249, 244, 44.14, 44.15, 44.16, 44.17, 44.18, 44.19, 44.21, 44.22, 44.23, 44.24, 44.25, 44.26, 44.27, 44.28, 44.29, 44.3, 44.31, 44.32, 44.33, 44.34, 44.35, 44.36, 44.37, 44.38

(56) References Cited

U.S. PATENT DOCUMENTS 5,623,372 * 4/1997 Matsui .................................. 359/814

FOREIGN PATENT DOCUMENTS 9-128856   5/1997 (JP) .
411185411A  7/1999 (JP) .

* cited by examiner

Primary Examiner—David L. Ometz
Assistant Examiner—Franklin D. Altman, III
(74) Attorney, Agent, or Firm—Armstrong, Westerman, Hattori, McLeland & Naughton, LLP

(57) ABSTRACT

A disk recording or playback device comprises as mounted on a chassis a support member for receiving a cartridge containing a disk, a pickup movable along a signal recording surface of the disk, and a drive mechanism for moving the pickup. The drive mechanism is accommodated in a bracket provided on the chassis. The bracket is removably at attached to the chassis, and the support member is formed integrally with the bracket and projects outward beyond the chassis.

2 Claims, 4 Drawing Sheets

RECORDING OR PLAYBACK DEVICE FOR DISK CONTAINED IN CARTRIDGE

FIELD OF THE INVENTION

The present invention relates to a recording or playback device for a disk contained in a cartridge.

BACKGROUND OF THE INVENTION

Recording or playback devices have already been proposed for use with cartridges 60 containing a disk 6 (see FIG. 1).

FIG. 4 is a plan view of a mechanism deck of such a disk recording or playback device. A turntable and a pickup 2 are provided on the lower side of a chassis 1, projecting upward beyond the chassis 1 through an opening 10 formed in the chassis 1. The pickup 2 is supported movably toward and away from the turntable 5 by a guide rod 11 extending across the opening 10.

A drive mechanism 4 for moving the pickup 2 is mounted on the chassis 1 at one side of the turntable 5. FIG. 5 is a perspective view of the drive mechanism 4. The drive mechanism 4 has a bracket 3 including three vertical plates 35, 35a, 35b in parallel to one another, and comprises a screw rod 40, a reduction gear 42 and a motor M1 which are mounted on the bracket 3. The bracket 3 is made from a synthetic resin by injection molding.

The motor M1 carrying a gear 41 at its forward end is fitted to the vertical plate 35b at right. The gear 41 is coupled to the reduction gear 42 which is mounted on the middle vertical plate 35a. The screw rod 40 extends between and is supported by the vertical plate 35 at left and the middle vertical plate 35a. An intermediate gear 43 fitted to one end of the screw rod 40 is in mesh with the reduction gear 42.

As shown in FIG. 4, the bracket 4 is attached to the rear side of the chassis 1, with the screw rod 40 in parallel to the guide rod 11. The screw rod 40 is in screw-thread engagement with the pickup 2. The rotation of the motor M1 is transmitted through the reduction gear 42 and the intermediate gear 43 to the screw rod 40, rotating the screw rod 40 and thereby moving the pickup along the guide rod 11.

The chassis 1 is provided at a corner with a support member 8 for receiving the cartridge 60 at its bottom. The support member 8, which is made of metal, is mounted on the chassis 1 by crimping. The support member 8 is a stepped rod, and a peripheral edge portion of the cartridge 60 defining a fitting cavity 62 formed in the bottom surface of the cartridge bears on the upper face of stepped portion 80 of the support member 8 as shown in FIG. 3.

With the conventional device, however, the support member 8 and the bracket 3 are separate parts and are attached to the chassis 1 individually. In view of the fact that the support member 8 is positioned in the vicinity of the bracket 3, the present applicant has conceived the idea of providing the support member 8 on the bracket 3 integrally therewith to reduce the number of components.

SUMMARY OF THE INVENTION

An object of the present invention is to reduce the number of components of a mechanism deck for use in disk recording or playback devices.

The present invention provides a disk recording or playback device which comprises as mounted on a chassis 1 a support member 8 for receiving a cartridge 60 containing a disk, a pickup 2 movable along a signal recording surface of the disk, and a drive mechanism 4 for moving the pickup 2, the drive mechanism 4 being accommodated in a bracket 3 provided on the chassis 1.

The bracket 3 is removably attached to the chassis 1, and the support member 8 is formed integrally with the bracket 3 and projects outward beyond the chassis 1.

Since the support member 8 is formed integrally with the bracket 3, the device of the invention is smaller in the number of components than the conventional device wherein the bracket 3 and the support member 8 are provided separately. This reduces the number of steps for assembling the device to result in an improved work efficiency.

DESCRIPTION OF THE PREFERRED EMBODIMENT

An embodiment of the present invention will be described below in detail with reference to the drawings.

Figure 1:
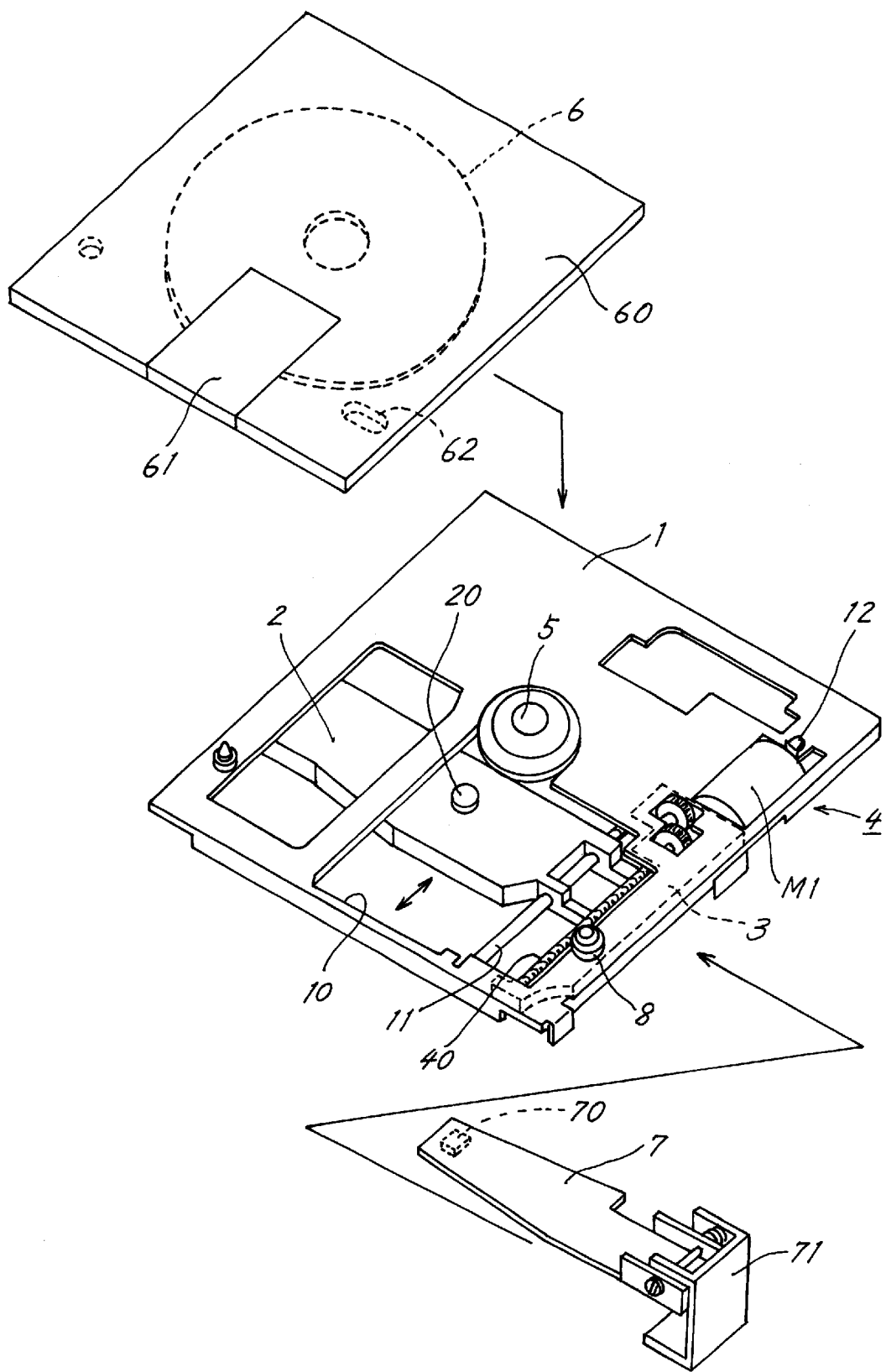
FIG. 1 is an exploded perspective view of a disk recording or playback device.

FIG. 1 is an exploded perspective view of a disk recording or playback device. As previously stated, a disk 6 is contained in a cartridge 60, which is provided with a shutter 61 opened to expose the disk or alternatively closed. Signals can be recorded on or reproduced from the disk as exposed with the shutter 61 opened.

As in the prior art, arranged on the lower side of the chassis 1 are a turntable 5 and a pickup 2 having an objective lens 20. The pickup 2 is supported movably toward and away from the turntable 5 by a guide rod 11 extending across an opening 10.

The pickup 2 has a head lever 7 attached thereto by a support piece 71 and provided with a recording head 70 at a free end of the lever 7. The head lever 7 is pivoted to the support piece 71. Signals can be recorded on the disk 6 when the head lever 7 is lowered to bring the head 70 into contact with the disk 6, with the shutter 61 opened.

The cartridge 60 is received at its bottom by the support member 8 to be described below and a support projection 12. A drive mechanism 4 for moving the pickup 2 is mounted on the chassis 1 at one side of the turntable 5.

Figure 2:
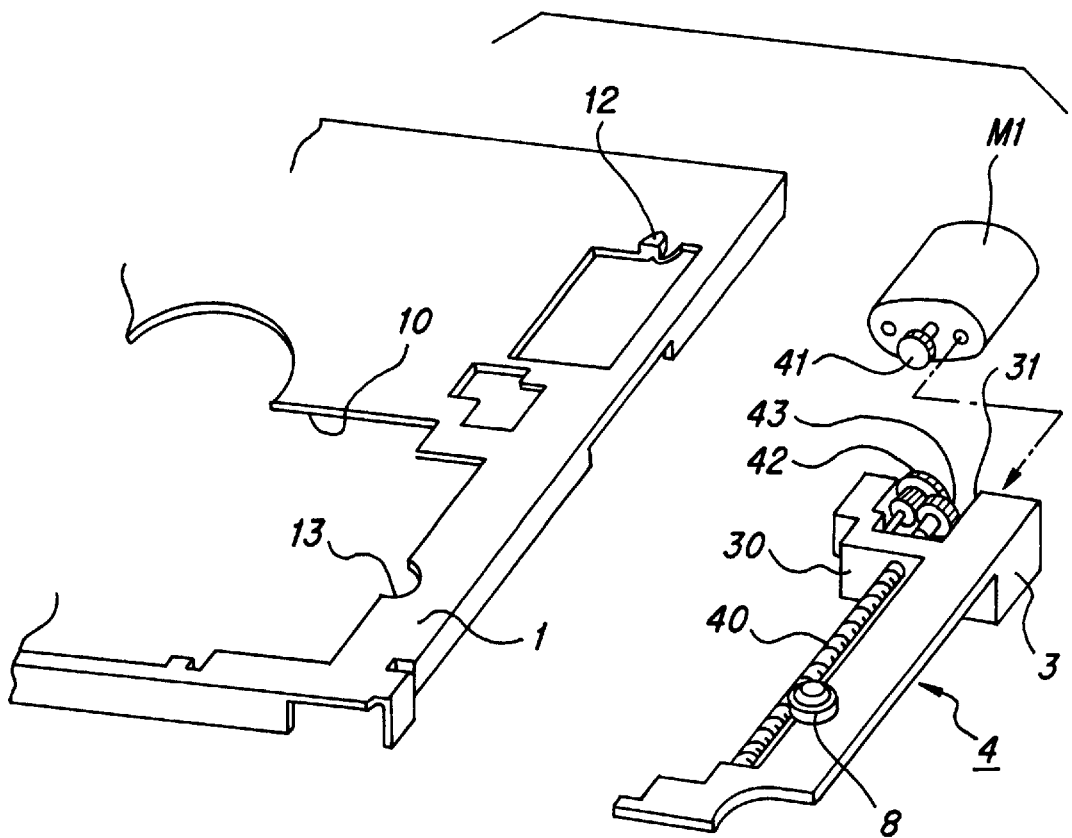
FIG. 2 is an exploded perspective view of a drive mechanism and a chassis.
Figure 3:
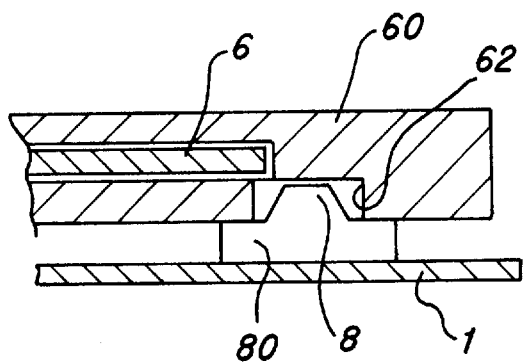
FIG. 3 is a view in section showing a cartridge and a conventional support member fitting therein.
Figure 4:
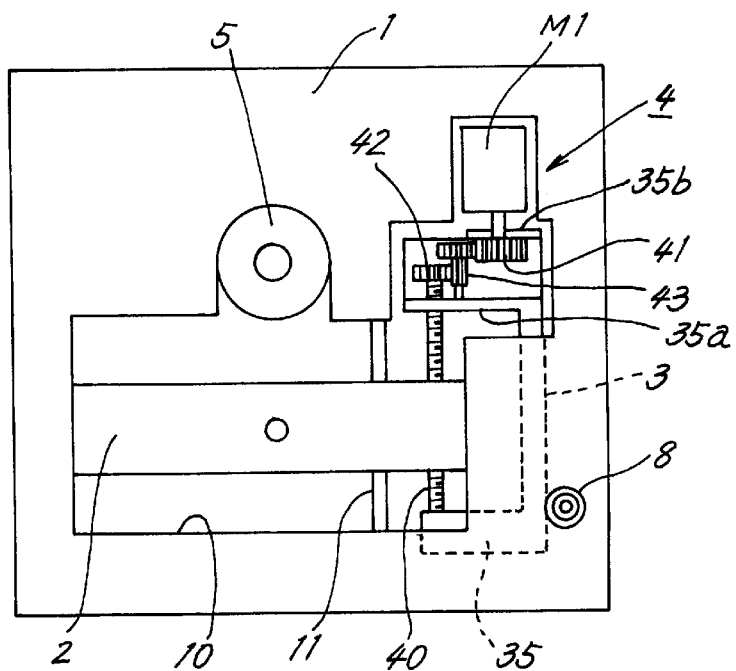
FIG. 4 is a plan view of a conventional disk recording or playback device.
Figure 5:
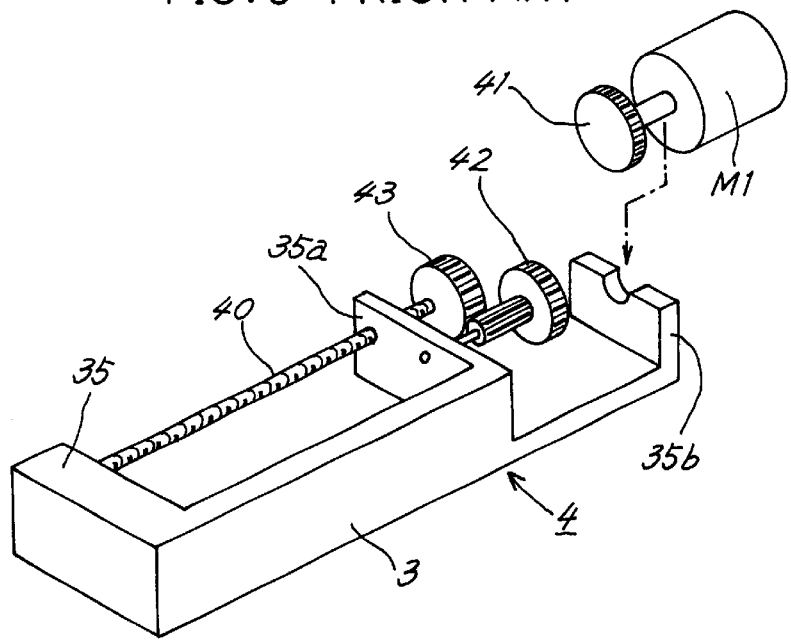
FIG. 5 is a perspective view of a conventional drive mechanism.

FIG. 2 is an exploded perspective view of the drive mechanism 4 and the chassis 1. The drive mechanism 4 is provided with a bracket 3 having a length directed in the direction of movement of the pickup 2 and made from a synthetic resin by injection molding. The bracket 3 is formed with a cutout 30 having an open side, and a recessed portion 31. A motor M1 is attached to one end of the bracket 3 at one side of the recessed portion 31. The motor M1 has a gear 41 attached to the outer end of its drive shaft and fitted in the recessed portion 31. The gear 41 is in mesh with a reduction gear 42 disposed in the recessed portion 31.

A screw rod 40 is supported by the bracket 3 to extend through the cutout 30 and has one end projecting into the recessed portion 31 through a bracket side wall defining the cutout 30. An intermediate gear 43 is mounted on the rod end and meshes with the reduction gear 42. The rotation of the motor M1 is transmitted to the screw rod 40 through the gear 41, reduction gear 42 and intermediate gear 43.

Figure 6:
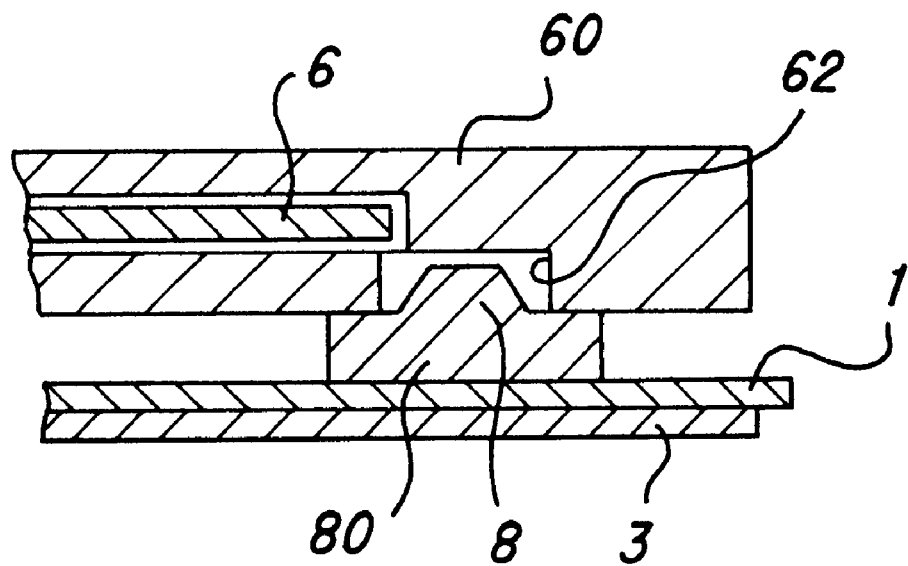
FIG. 6 is a view in section showing a cartridge and a support member fitting therein.

The support member 8 for receiving the bottom of the cartridge 60 is formed on the bracket 3 integrally therewith at one side of the screw rod 40. The chassis 1 is formed with a recess 13 continuous with the opening 10 and positioned in register with the support member 8. As shown in FIG. 6, the support member 8 is a stepped rod, and a peripheral edge portion of the cartridge 60 defining a fitting cavity 62 formed in the bottom surface of the cartridge bears on the upper face of stepped portion 80 of the support member 8 in the same manner as in the prior art.

As seen in FIG. 1, the bracket 3 is removably attached to the lower side of the chassis 1, with the screw rod 40 directed in the direction of movement of the pickup 2 and in screw-thread engagement with the pickup 2. When rotated, the motor M1 rotates the screw rod 40 to move the pickup 2.

The support member 8 extends through the recess 13 shown in FIG. 2, projecting upward beyond the chassis 1. The bottom of the cartridge 60 is placed on the support member 8 and the support projection 12 and is thereby positioned in place with respect to the direction of height.

Since the support member 8 is integral with the bracket 3, the present embodiment is smaller in the number of components than the conventional device wherein the bracket 3 and the support member 8 are provided separately. This reduces the number of steps for assembling the device to result in an improved work efficiency.

Although the support member 8 is integral with the bracket 3 according to the embodiment described, the support projection 12 may be formed integrally with the bracket 3.

What is claimed is:

1. A disk recording or playback device comprising as mounted on a chassis, a support member fittable in a fitting cavity in a cartridge containing a disk, a pickup movable along a signal recording surface of the disk, and a drive mechanism for moving the pickup, the drive mechanism being accommodated in a bracket provided on the chassis, the device being characterized in that the bracket is removably attached to the chassis, and the support member is formed integrally with the bracket and projects outward beyond the chassis.

2. A disk recording or playback device according to claim 1 wherein the drive mechanism comprises a motor, and a screw rod coupled to the motor and in screw-thread engagement with the pickup.

* * * * *